United States Patent Office 3,845,086
Patented Oct. 29, 1974

3,845,086
N-ACYL-N-HYDROCARBYLUREAS AND THEIR PREPARATION BY OXIDATIVE HYDROLYSIS OF N-CYANOCARBIMINES
Frank Dennis Marsh, Wilmington, Del., assignor to E. I. du Pont de Nemours and Company, Wilmington, Del.
No Drawing. Filed Apr. 7, 1972, Ser. No. 242,230
Int. Cl. C07c 127/22
U.S. Cl. 260—404.5        9 Claims

ABSTRACT OF THE DISCLOSURE

Disclosed herein are N-acyl-N-hydrocarbylureas of the formula $$R_1-\overset{O}{\underset{\|}{C}}-\overset{R_2}{\underset{|}{N}}-\overset{O}{\underset{\|}{C}}-NH_2$$

wherein: $R_1$ and $R_2$, taken individually, are the same or different monovalent hydrocarbon alkyl, cycloalkyl, aryl, alkaryl or aralkyl groups of up to 18 carbons, or, taken together, form a divalent alkylene group of 2 to 14 carbons that can be part of a saturated aliphatic hydrocarbon polycyclic system of 4 to 16 carbons, and wherein the alkyl, cycloalkyl, aryl and alkylene groups can be substituted with a member selected from the group consisting of halogen, hydrocarbalkoxy of up to 6 carbons, hydrocarbaryloxy of 6 to 10 carbons, hydrocarbalkoxycarbonyl of up to 7 carbons and hydrocarbaryloxycarbonyl of 7 to 11 carbons.

Also disclosed is utility thereof as a foliar fungicide; and the process therefor comprising the oxidative hydrolysis of corresponding N-cyanocarbimines in aqueous base.

BACKGROUND OF THE INVENTION

1. Field of the Invention

This invention relates to N-acyl-N-hydrocarbylureas and their preparation by reaction of N-cyanocarbimines with an oxidant in aqueous alkali.

2. Description of the Prior Art

Coassigned U.S. Pat. No. 3,510,474 teaches the preparation of the N-cyanocarbimine starting reactants employed in the process of this invention.

SUMMARY OF THE INVENTION

The novel compounds have the formula $$R_1-\overset{O}{\underset{\|}{C}}-\overset{R_2}{\underset{|}{N}}-\overset{O}{\underset{\|}{C}}-NH_2$$

wherein: $R_1$ and $R_2$, taken individually, are the same or different monovalent hydrocarbon alkyl, cycloalkyl, aryl, alkaryl or aralkyl groups of up to 18 carbons, or, taken together, form a divalent alkylene group of 2 to 14 carbons that can be part of a saturated aliphatic hydrocarbon polycyclic system of 4 to 16 carbons, and wherein the alkyl, cycloalkyl, aryl and alkylene groups can be substituted with a member selected from the group consisting of halogen, hydrocarbalkoxy of up to 6 carbons, hydrocarbaryloxy of 6 to 10 carbons, hydrocarbalkoxycarbonyl of up to 7 carbons and hydrocarbaryloxycarbonyl of 7 to 11 carbons.

The novel process for making the compounds of this invention comprises the oxidative hydrolysis of the corresponding N-cyanocarbimines by reacting the N-cyanocarbimine with an oxidant and a base according to the reaction

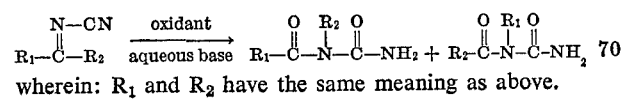

wherein: $R_1$ and $R_2$ have the same meaning as above.

Reaction temperatures are about $-20°$ C. to $75°$ C. and preferably about $0°$ C. to $35°$ C. The products can be isolated by standard techniques that will be obvious to those skilled in the art.

The N-acyl-N-hydrocarbylureas of the invention are useful as foliar fungicides.

DETAILS OF THE INVENTION

Basic aqueous hydrogen peroxide is the preferred reagent for the oxidative hydrolysis. It can be formulated with initial peroxide concentrations in the range from about 3% to about 50% by weight, preferably at about 30%, and the base is preferably sodium carbonate at about 10% initial concentration. Other bases such as sodium or potassium hydroxide are equally effective, and other peroxides such as trifluoroacetyl peroxide, tertiary butyl peroxide and m-chloroperbenzoic acid can be used. The peroxide can be used in proportions ranging from the equivalent 1:1 peroxide:cyanocarbimine mole ratio to any higher ratio, the practical higher mole ratio limit being about 10:1.

The reaction medium may consist of water alone, or preferably a mixture of water and a water-miscible solvent. Suitable water-miscible solvents include lower aliphatic alcohols such as methanol, ethanol; lower aliphatic ketones such as acetone, methyl ethyl ketone; and ethers such as tetrahydrofuran, dioxane, ethylene glycol dimethyl ether, diethylene glycol dimethyl ether.

Warning

When an excess of peroxide is used, caution should be practiced in the isolation of the products to avoid possible explosions. Evaporation of the original reaction mixture to dryness should be avoided. It is preferable to concentrate the mixture and then extract the product with a suitable solvent. Alternatively, the excess peroxide can be chemically reduced, for example, with sodium bisulfite, and the peroxide-free mixture can then be evaporated to dryness with safety.

Representative N-acyl-N-hydrocarbylureas of the invention and their N-cyanocarbimine precursors are presented in the following Table.

TABLE

| N-cyanocarbimine | N-acyl-N-hydrocarbylurea |
|---|---|
| $CH_3-\overset{N-CN}{\underset{\|}{C}}-CH_3$ <br> Isopropylidenecyanamide. | $CH_3-\overset{O}{\underset{\|}{C}}-\overset{CH_3}{\underset{\|}{N}}-\overset{O}{\underset{\|}{C}}-NH_2$ <br> N-acetyl-N-methylurea. |
| $CH_3(CH_2)_{12}-\overset{N-CN}{\underset{\|}{C}}-CH_3$ <br> 2-pentadecylidenecyanamide. | $CH_3(CH_2)_{12}-\overset{O}{\underset{\|}{C}}-\overset{CH_3}{\underset{\|}{N}}-\overset{O}{\underset{\|}{C}}-NH_2$ <br> N-methyl-N-tridecanoylurea. |
|  | $CH_3-\overset{O}{\underset{\|}{C}}-\overset{(CH_2)_{12}CH_3}{\underset{\|}{N}}-\overset{O}{\underset{\|}{C}}-NH_2$ <br> N-acetyl-N-tridecylurea. |
| $C_6H_{11}-\overset{N-CN}{\underset{\|}{C}}-CH_3$ <br> 1-cyclohexyl-1-ethylidenecyanamide. | $C_6H_{11}-\overset{O}{\underset{\|}{C}}-\overset{CH_3}{\underset{\|}{N}}-\overset{O}{\underset{\|}{C}}-NH_2$ <br> N-cyclohexanoyl-N-methylurea. |
|  | $CH_3-\overset{O}{\underset{\|}{C}}-\overset{C_6H_{11}}{\underset{\|}{N}}-\overset{O}{\underset{\|}{C}}-NH_2$ <br> N-acetyl-N-cyclohexylurea |
| $Cl-C_6H_{10}-\overset{N-CN}{\underset{\|}{C}}-CH_3$ <br> 1-(4-chlorocyclohexyl)-1-ethylidenecyanamide. | $Cl-C_6H_{10}-\overset{O}{\underset{\|}{C}}-\overset{CH_3}{\underset{\|}{N}}-\overset{O}{\underset{\|}{C}}-NH_2$ <br> N-(4-chlorocyclohexanoyl)-N-methylurea. |

TABLE—Continued

| N-cyanocarbimine | N-acyl-N-hydrocarbylurea |
|---|---|
| $$CH_3-\overset{\overset{\displaystyle N-CN}{\|}}{C}-C_6H_{10}-\overset{\overset{\displaystyle O}{\|}}{C}-OC_2H_5$$ 1-(4-carbethoxycyclohexyl)-1-ethylidenecyanamide. | $$CH_3-\overset{\overset{\displaystyle O}{\|}}{C}-\overset{\overset{\displaystyle C_6H_{10}-Cl}{\|}}{N}-\overset{\overset{\displaystyle O}{\|}}{C}-NH_2$$ N-acetyl-N-(4-chlorocyclohexyl)-urea |
| $$C_2H_5O-\overset{\overset{\displaystyle O}{\|}}{C}-C_6H_{10}-\overset{\overset{\displaystyle N-CN}{\|}}{C}-CH_3$$ 1-(4-carbethoxycyclohexyl)-1-ethylidenecyanamide. | $$C_2H_5O-\overset{\overset{\displaystyle O}{\|}}{C}-C_6H_{10}-\overset{\overset{\displaystyle CH_3}{\|}}{C}-\overset{\overset{\displaystyle O}{\|}}{N}-\overset{\overset{\displaystyle O}{\|}}{C}-NH_2$$ N-(4-carbethoxycyclohexanoyl)-N-methylurea. |
|  | $$CH_3-\overset{\overset{\displaystyle O}{\|}}{C}-\overset{\overset{\displaystyle C_6H_{10}-C-OC_2H_5}{\|}}{N}-\overset{\overset{\displaystyle O}{\|}}{C}-NH_2$$ N-acetyl-N-(4-carbethoxycyclohexyl)-urea. |
| Cyclobutylidenecyanamide. (=N—CN) | 2-pyrrolidone-N-carboxamide. |
| Cyclohexylidenecyanamide. (=N—CN) | Aza-2-ketocycloheptane-N-carboxamide. |
| $(CH_2)_{14}\overset{\|}{C}=N-CN$ Cyclopentadecylidene-cyanamide. | Aza-2-ketocyclohexadecane-N-carboxamide. |
| $$C_6H_5-\overset{\overset{\displaystyle N-CN}{\|}}{C}-CH_3$$ 1-phenyl-1-ethylidene-cyanamide. | $$C_6H_5-\overset{\overset{\displaystyle O}{\|}}{C}-\overset{\overset{\displaystyle CH_3}{\|}}{N}-\overset{\overset{\displaystyle O}{\|}}{C}-NH_2$$ N-benzoyl-N-methylurea. |
|  | $$CH_3-\overset{\overset{\displaystyle O}{\|}}{C}-\overset{\overset{\displaystyle C_6H_5}{\|}}{N}-\overset{\overset{\displaystyle O}{\|}}{C}-NH_2$$ N-acetyl-N-phenylurea. |
| $$CH_3O-C_6H_4-\overset{\overset{\displaystyle N-CN}{\|}}{C}-C_3H_7$$ 1-(4-methoxyphenyl)-1-butylidenecyanamide. | $$CH_3O-C_6H_4-\overset{\overset{\displaystyle O}{\|}}{C}-\overset{\overset{\displaystyle C_3H_7}{\|}}{N}-\overset{\overset{\displaystyle O}{\|}}{C}-NH_2$$ N-(4-methoxybenzoyl)-N-propylurea. |
|  | $$C_3H_7-\overset{\overset{\displaystyle O}{\|}}{C}-\overset{\overset{\displaystyle C_6H_4OCH_3}{\|}}{N}-\overset{\overset{\displaystyle O}{\|}}{C}-NH_2$$ N-butyryl-N-(4-methoxyphenyl)-urea |
| $$C_{10}H_7O-CH_2-\overset{\overset{\displaystyle N-CN}{\|}}{C}-CH_3$$ 1-($\beta$-naphthoxy)-2-propylidenecyanamide. | $$C_{10}H_7O-CH_2-\overset{\overset{\displaystyle O}{\|}}{C}-\overset{\overset{\displaystyle CH_3}{\|}}{N}-\overset{\overset{\displaystyle O}{\|}}{C}-NH_2$$ N-methyl-N-($\beta$-naphthoxyacetyl)-urea. |
|  | $$CH_3-\overset{\overset{\displaystyle O}{\|}}{C}-\overset{\overset{\displaystyle CH_2-OC_{10}H_7}{\|}}{N}-\overset{\overset{\displaystyle O}{\|}}{C}-NH_2$$ N-acetyl-N-($\beta$-naphthoxymethyl)-urea. |
| $$C_6H_5\overset{\overset{\displaystyle O}{\|}}{C}-O-CH_2-\overset{\overset{\displaystyle N-CH_3}{\|}}{C}-CH_3$$ 1-benzoxy-2-propylidene-cyanamide. | $$C_6H_5\overset{\overset{\displaystyle O}{\|}}{C}-O-CH_2-\overset{\overset{\displaystyle CH_3}{\|}}{C}-\overset{\overset{\displaystyle O}{\|}}{N}-\overset{\overset{\displaystyle O}{\|}}{C}-NH_2$$ N-benzoxyacetyl-N-methylurea. |
|  | $$CH_3-\overset{\overset{\displaystyle O}{\|}}{C}-\overset{\overset{\displaystyle CH_2OCC_6H_5}{\|}}{N}-\overset{\overset{\displaystyle O}{\|}}{C}-NH_2$$ N-acetyl-N-(benzoxymethyl)urea. |

DESCRIPTION OF THE PREFERRED EMBODIMENTS

The following Examples are meant to illustrate but not to limit the invention. Reduced pressures, where employed, are indicated in terms of millimeters of mercury.

The compounds of this invention are useful as foliar fungicides. The compounds of Examples 1 to 5 were tested against various types of fungus growth and their effectiveness is reported at the end of each Example description.

Preparation of the N-Cyanocarbimine Starting Reactants

The N-cyanocarbimine in each of the following seven Examples was prepared by reacting the following compounds at a temperature between about −25° C. to 75° C. in accordance with the disclosure and teaching in co-assigned U.S. Pat. No. 3,510,474:

Example No., this application | Reactants to produce N-cyanocarbimines
1 — Hexene-1 and cyanogen azide.
2 — Cyclopentene and cyanogen azide.
3 — Cyclooctene and cyanogen azide.
4 — Cyclododecene and cyanogen azide.
5 — Bicyclo[2.2.2]octene and cyanogen azide.
6 — Methylene adamantane and cyanogen azide.
7 — 3,3-dimethylbutene and cyanogen azide.

EXAMPLE 1

N-Methyl-N-(1-pentanoyl)urea (A) and N-Acetyl-N-butylurea (B)

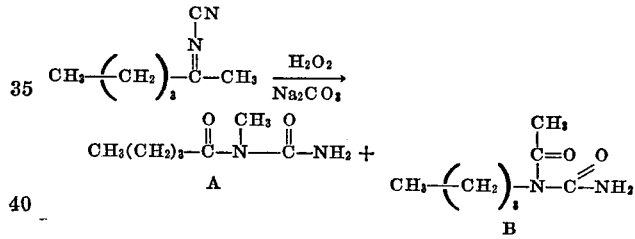

1-Methylpentylidenecyanamide (18.6 g., 0.15 mole) in acetone (280 ml.) was cooled (0–5° C.) and stirred while adding 30% hydrogen peroxide (93 ml.) and then 10% aqueous sodium carbonate (93 ml.). After stirring an additional hour at 0° C. and 20 hours at room temperature, the mixture was concentrated on a rotary evaporator (1 mm./25° C.) to about 190 ml. and the concentrate extracted with methylene chloride (5× 150 ml.). The extract was dried (MgSO$_4$) and evaporated to dryness to give a nearly colorless oil (17.2 g., 72%). On standing at room temperature, fine white needles crystallized from the oil. The crystals were separated by filtration and then taken up in carbon tetrachloride, the solution being filtered again to remove a trace of undissolved material. Petroleum ether, when added to the CCl$_4$ filtrate, precipitated white needles (m.p. 69.2–70.3° C.) which were sublimed (60° C./0.1$\mu$) to give pure (A), m.p. 70.3–71.1° C.

Anal.—Calcd. for $C_7H_{14}N_2O_2$: C, 53.14; H, 8.92; N, 17.71. Found: C, 52.90; H, 9.09, N, 18.09.

$\gamma^{KBr}_{max.}$: 2.96, 3.09$\mu$ (NH$_2$); 3.34, 3.44$\mu$ (sat. C—H); 5.82, 5.90$\mu$ (>C=O); 6.26$\mu$ (NH$_2$).

$\delta^{CDCl_3}_{max.}$: 8.67 and 6.30

$\left(\text{two 1H broad singlets, } \overset{\overset{\displaystyle O}{\|}}{C}-NH_2\right)$;

3.30 (3H singlet, —NCH$_3$); 2.57

$\left(\text{2H triplet } -CH_2-\overset{\overset{\displaystyle O}{\|}}{C}-\right)$;

1.2–1.95 (4H complex group, methylene protons); 1.0 (3H complex group, terminal —CH$_3$).

H NMR analysis of the original isolated colorless oil showed it contained 45.5% (A) and 54.5% (B).

The H NMR spectra of the mixture showed the following peaks:

$\delta_{max.}^{CDCl_3}$: 8.57, 6.83

$$\left(\text{two 1H broad singlets, } \underset{\parallel}{\overset{O}{C}}-NH_2\right);$$

3.23 (3H singlet); 2.53 (2H triplet); 2.27 (3H singlet; 1.2–1.95 (4H complex group); 1.0 (3H complex group).

The compound was found effective against apple scab, bacterial spot, and cucumber powdery mildew fungi when applied to plant foliage at a concentration of 100 p.p.m., in solution.

EXAMPLE 2

2-Piperidone-N-carboxamide

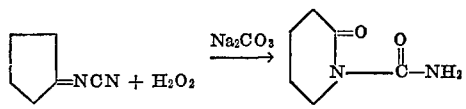

Cyclopentylidenecyanamide (5.0 g., 0.046 mole) in acetone (45 ml.) was cooled (0.5° C.) and stirred while adding 30% hydrogen peroxide (25 ml.) and then 10% aqueous sodium carbonate (25 ml.). The mixture was warmed slowly to room temperature and stirred overnight. Evaporation of the mixture to dryness gave a white solid which was extracted with acetone and then ethyl alcohol. The combined extracts were evaporated to dryness and the resulting solid dissolved in acetone and filtered to separate a by-product (0.65 g.). Evaporation of the filtrate to dryness gave essentially pure 2-piperidone-N-carboxamide (5.15 g. 79%), which was recrystallized first from cold diethyl ether and then ethyl acetate-petroleum ether and finally sublimed to give analytically pure product, m.p. 89–90.1° C.

Anal.—Calcd. for $C_6H_{10}N_2O_2$: C, 50.69; H, 7.09; N, 19.71; M.W., 142.16. Found: C, 50.89, 50.75; H, 7.01, 7.00; N, 20.11, 20.05; M.W., 139 (cryoscopic) in dimethyl sulfoxide.

$\gamma_{max.}^{KBr}$: 2.97, 3.17μ ($NH_2$); 3.39, 3.47μ (sat. C—H); 5.92μ (>C=O) shoulder, 6.03μ (N—H); 6.43μ (NH).

$\delta_{max.}^{CDCl_3}$: 8.92 $\left(\text{1H broad singlet, } \underset{\parallel}{\overset{O}{C}}-NH\right)$;

6.39 $\left(\text{1H broad singlet } \underset{\parallel}{\overset{O}{C}}-NH\right)$; 3.80 $\left(\text{2H complex, }-CH_2-N-\right)$;

2.56 $\left(\text{2H complex, }-CH_2-\underset{\parallel}{\overset{O}{C}}-\right)$;

1.83 (4H complex, remaining methylene protons).

Signals at 8.92 and 6.39 collapsed to a single peak on heating the sample at 125° C. and reverted to the original pattern on cooling to room temperature.

The compound was found effective against apple scab fungus when applied to plant foliage at a concentration of 100 p.p.m., in solution.

EXAMPLE 3

Aza-2-ketocyclononane-N-carboxamide

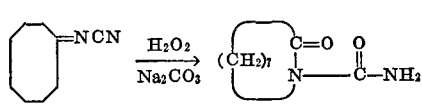

Cyclooctylidenecyanamide (15 g., 0.1 mole) in acetone (225 ml.) was cooled (0–5° C.) and stirred while adding 30% hydrogen peroxide (75 ml.) and then 10% aqueous sodium carbonate (75 ml.). After stirring an additional one-half hour at 0° C. and 20 hours at room temperature, the mixture was concentrated on a rotary evaporator (5 mm./25° C.) to about 100 ml. and then extracted with methylene chloride (4×200 ml.). The extract was dried and evaporated to dryness to give essentially pure product (14.5 g., 79%). An aliquot (9.35 g.) of the product was adsorbed on a magnesia silica gel (60–100 mesh, 400 g.; column 21" x 2") and eluted as follows: n-hexane, nil; chloroform, 7.25 g.; tetrahydrofuran, 1.25 g.; methanol, 0.90 g. The fraction eluted with chloroform was recrystallized from cyclohexane to give analytically pure product.

Anal.—Calcd. for $C_9H_{16}N_2O_2$: C, 58.67; H,: 8.75; N, 15.21. Found: C, 58.43; H, 8.98; N, 14.89.

$\gamma_{max.}^{KBr}$: 2.95, 3.08μ (NH); 3.40, 3.48μ (sat. C—H); 5.82, 5.94, 6.04μ (>C=O); 6.3μ (NH).

$\delta_{max.}^{CDCl_3}$: 9.03, 6.10

$$\left(\text{two 1H broad singlets, } \underset{\parallel}{\overset{O}{C}}-NH_2\right);$$

4.00 (2H complex group —$CH_2$—N—); 1.40–2.43 (10H complex group, methylene protons).

MASS SPECTROMETRIC CRACKING PATTERN

| Measured m/e | Calcd. m/e | Assignment |
|---|---|---|
| 184 | 184 | Molecular ion $m^+$ |
| 169 | | $m-(CH_3$ or NH) |
| 156 | | $m-(C_2H_4)$ |
| 141.1153 | 141.1154 | $C_8H_{15}NO$, $m-(CONH)$ |
| 141.0663 | 141.0664 | $C_6H_9N_2O_2$, $m-(C_3H_7)$ |

The compound was found effective against apple scab and bacterial spot fungi when applied to plant foliage at a concentration of 100 p.p.m. in solution.

EXAMPLE 4

Aza-2-ketocyclotridecane-N-carboxamide

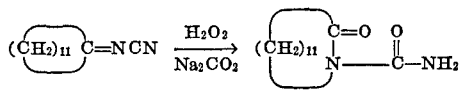

Cyclododecylidenecyanamide (8.15 g., 0.039 mole) in acetone (60 ml.) was cooled (0–5° C. while adding 30% hydrogen peroxide (30 ml.) and then 10% aqueous sodium carbonate (30 ml.). After stirring an additional 0.5 hour at 0° C. and 18 hours at room temperature, the mixture was concentrated on a rotary evaporator (1 mm./25° C.) to about 60 ml., and the concentrate extracted with methylene chloride. The dried extract was evaporated to dryness to give essentially pure product (8.25 g., 87%). An aliquot of the product was recrystallized once from methylene chloride-petroleum ether and once from carbon tetrachloride-petroleum ether to give pure product, m.p. 149–150.4° C.

Analysis.—Calcd. for $C_{13}H_{24}O_2N_2$: C, 64.96; H, 10.07; N, 11.66. Found: C, 65.18; H, 10.17; N, 11.61, 11.71.

$\gamma_{max.}^{KBr}$: 2.98, 3.08μ ($NH_2$); 3.41, 3.49μ (sat. C—H); 5.89, 5.97μ (>C=O); 6.34μ ($NH_2$).

$\delta_{max.}^{CDCl_3}$: 4.5–8.3 (2H very broad exchangeable peak);

3.77 $\left(\text{2H complex group, } CH_2-N-\right)$;

2.59 $\left(\text{2H complex group, }-CH_2-\underset{\parallel}{\overset{O}{C}}-\right)$;

1.2–2.0 (18H complex group, methylene protons).

The compound was found effective against apple scab and bacterial spot fungi when applied to plant foliage at a concentration of 100 p.p.m., in solution.

EXAMPLE 5

3-Keto - 2 - azabicyclo[3.2.2]nonane-N-carboxamide (C) and 2-Keto-3-azabicyclo[3.2.2]nonane-N-carboxamide (D)

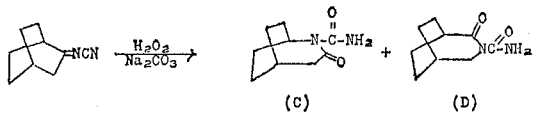

Bicyclo[2.2.2]-2-octylidenecyanamide (15 g., 0.10 mole) in acetone (225 ml.) was cooled (0–4° C.) and stirred while adding 30% hydrogen peroxide (75 ml.) and then 10% aqueous sodium carbonate (75 ml.). After stirring an additional 0.5 hour at 0° C. and 16 hours at room temperature, the mixture was concentrated on a rotary evaporator (1 mm./25° C.) to about 150 ml. Methylene chloride (150 ml.) was added and the two-phase mixture filtered to separate insoluble material. The organic layer of the filtrate was separated, and the aqueous layer was further extracted with methylene chloride (4× 150 ml.). The combined extracts were dried and evaporated to dryness to give a white crystalline residue (16.05 g.). This residue was slurried with methylene chloride and filtered to separate an additional amount of insoluble material. The filtrate was evaporated to dryness to give a white crystalline solid (14.0 g., 78%) which was combined with a similar fraction (9.30 g.) from another run and adsorbed on a magnesia-silica gel (442 g., column 22″ x 2″) and eluted as follows: n-hexane, nil; chloroform, 9.95 g.; methanol, 11.55 g. H NMR analysis of the chloroform eluant indicated it was a mixture of ~83% (C) and ~17% (D). This fraction was again adsorbed on a magnesia-silica gel (438 g., column 22″ x 2″) and eluted as follows: n-hexane, nil; carbon tetrachloride, nil; 50% carbon tetrachloride/50% chloroform, nil; chloroform, 5.49 g., 2.72 g. and 1.14 g.; tetrahydrofuran, 1.13 g. Recrystallization from cyclohexane of the largest (5.49 g.) fraction eluted with chloroform gave pure (C), m.p. 121.6–122.6.

*Analysis.*—Calcd. for $C_9H_{14}O_2N_2$: C, 59.32; H, 7.74; N, 15.37. Found: C, 59.35; H, 7.98; N, 15.28.

$\gamma_{max.}^{KBr}$: 2.98, 3.12 $\mu$ ($NH_2$); 3.41, 3.48$\mu$ (sat. C—H); 5.85$\mu$ (lactam >C=O); 6.04$\mu$ (urea >C=O); 6.34$\mu$ ($NH_2$).

$\delta_{max.}^{CDCl_3}$: 9.07, 6.03

(two 1H broad single peaks, —$\overset{O}{\underset{\|}{C}}$—$NH_2$);

5.09 (1H triplet further split, bridgehead proton adjacent to nitrogen);

2.87 (2H doublet, J ~4 c.p.s., —$CH_2$—$\overset{O}{\underset{\|}{C}}$—);

1.43–2.27 (9H complex group, unassigned).

MASS SPECTRUM CRACKING PATTERN

| Measured m/e | Calcd. m/e | Assignment |
|---|---|---|
| 182.1035 | 182.1055 | $C_9H_{14}N_2O_2$ mol on m+ |
| 154.1106 | 154.1006 | $C_8H_{14}N_2O$ m-(CO) |
| 139.0998 | 139.0997 | $C_8H_{13}NO$ m-(CONH) |
| 125.0714 | 125.0715 | $C_6H_9N_2O$ m-(CO+$C_2H_5$) |

Recrystallization of the fraction (1.13 g.) eluted with tetrahydrofuran gave pure (D), m.p. 136–138° C.

*Analysis.*—Calcd. for $C_9H_{19}N_2O_2$: C, 59.32; H, 7.74; N, 15.37. Found: C, 59.12; H, 7.71; N, 15.39.

$\delta_{max.}^{CDCl_3}$: 9.00, 5.90

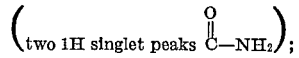
(two 1H singlet peaks $\overset{O}{\underset{\|}{C}}$—$NH_2$);

3.81 (2H doublet, J ~4 c.p.s., $CH_2$—N); 2.82 (1H complex group, bridgehead proton at C-1); 2.35 (1H broad complex group, bridgehead proton at C-5); 1.40–2.19 (8H complex group, unassigned).

The mass spectrometric cracking pattern of this fraction was essentially the same as that of (C) except for intensity ratios.

The compounds were found effective against bacterial spot and cucumber powdery mildew fungi when applied to plant foliage at a concentration of 100 p.p.m., in solution.

EXAMPLE 6

2-Aza-3-ketotricyclo[5.3.1.1^{5,9}]dodecane (E) and 3-Aza-2-ketotricyclo[5.3.1.1^{5,9}]dodecane (F)

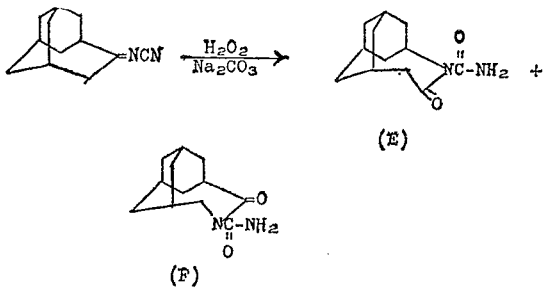

Tricyclo[4.3.1.1^{4,8}] - 2 - undecylidenecyanamide (18.40 g., 0.098 mole) in acetone (225 ml.) was cooled (0–5° C.) and stirred while adding 30% hydrogen peroxide (75 ml.) and then aqueous 10% sodium carbonate (75 ml.). After stirring two additional hours at 0° C. the mixture was concentrated to one-half the volume on a rotary evaporator (1 mm./25° C.). The concentrate was extracted with methylene chloride and the extract dried and evaporated to dryness to give a white solid (23.10 g.). The solid was slurried with methylene chloride and filtered to separate a white crystalline solid (3.0 g.) which was recrystallized from chloroform-n-hexane (m.p., 181–183° C.).

*Anal.*—Found: C, 63.81, 63.93; H, 8.13, 7.88; N, 12.52, 12.49.

The filtrate was evaporated to dryness to give a white solid (18.0 g.) which was adsorbed on a magnesia-silica gel (460 g.) from methylene chloride and eluted as follows: n-hexane, nil; carbon tetrachloride, nil; chloroform, nil; methylene chloride, 2.74 g.; methylene chloride/ 10% tetrahydrofuran, 0.4 g.; methylene chloride/20% tetrahydrofuran, 2.37 g.; tetrahydrofuran, 4.78 and 3.31 g. The first three fractions (2.74 g., 0.4 g. and 2.37 g.) had nearly identical infrared and H NMR spectra and melting points of 120.5–121.5, 120.5–121.5, and 115–116, respectively. When remelted, each of these fractions melted above 265–280° C. These fractions were shown by H NMR and $^{13}$C NMR to be an isomeric mixture of (E) and (F) in a ratio of approximately 2:1.

*Anal.*—Calcd for $C_{12}H_{18}N_2O_2$: C, 64.84; H, 8.16; N, 12.60.

Found: C, 64.97, 64.92; H, 8.14, 8.20; N, 12.34, 12.30.

$\gamma_{max.}^{KBr.}$: 2.98, 3.12 $\mu$ ($NH_2$); 3.42, 3.47$\mu$ (sat. C—H); 5.87, 6.05$\mu$ (>C=O); 6.38$\mu$ (—$NH_2$).

$\delta_{max.}^{CDCl_3}$: 7.09

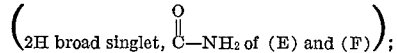
(2H broad singlet, $\overset{O}{\underset{\|}{C}}$—$NH_2$ of (E) and (F));

5.36 (1H triplet, bridgehead proton adjacent to nitrogen of (E)); 3.91 (doublet, J ~9 c.p.s., methylene protons adjacent to nitrogen of (E)); 2.98 (doublet, J ~6 c.p.s., methylene protons adjacent to carbonyl of (E)); 1.35–2.80 (12H complex group, methylene and bridgehead protons of (E) and (F)).

The $^{13}$C NMR spectrum showed 13 peaks in the saturated region (−43.0 to −70.0 p.p.m. for $CH_3I$ external) and four peaks in the carbonyl region at −177.1, −177.8, −200.2 and −202.5 p.p.m. The four peaks in the carbonyl region showed the presence of the two components in nearly balanced ratio of 2:1.

MASS SPECTROMETRIC CRACKING PATTERN

| Measured m/e | Calcd. m/e | Assignment |
|---|---|---|
| 227.137 | 227.136 | $C_1H_{18}N_2O_2$, m |
| 178.0 | | m-(C—NH$_2$) abundant metastable at m/e 172.7. |
| 150.0 | | $m\text{-}\left(\overset{O}{\overset{\|}{C}}\text{—NH}_2\text{—}\overset{O}{\overset{\|}{C}}\text{—}\right)$ |
| 164.0 | | $m\text{-}\left(N\text{—}\overset{O}{\overset{\|}{C}}\text{—NH}_2\right)$ |
| 137.0 | | $m\text{-}\left(CH_2\text{—}CH=N\text{—}\overset{O}{\overset{\|}{C}}\text{—NH}_2\right)$ |

The fraction eluted with tetrahydrofuran had infrared spectra nearly identical with the initial methylene chloride insoluble fraction.

EXAMPLE 7

N-Methyl-N-(trimethylacetyl)urea (G) and N-Acetyl-N-(t-butyl)urea (H)

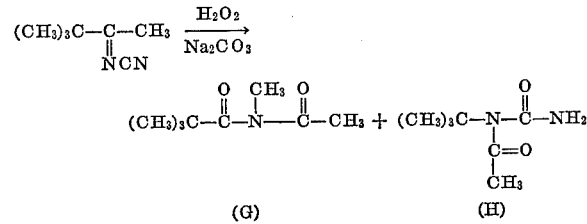

1-Methyl-2,2-dimethylpropylidenecyanamide (15.8 g., 0.138 mole) in acetone (250 ml.) was cooled (0–5° C.) and stirred while adding 30% hydrogen peroxide (85 ml.) and then 10% aqueous sodium carbonate (85 ml.). The mixture was warmed slowly to room temperature and stirred overnight. Volatile materials were removed on a rotary evaporator (0.5 mm./25° C.), and then absolute ethyl alcohol (100 ml.) was added and in turn removed on the rotary evaporator (0.5 mm./25° C.). A white residual solid product was obtained. This product was analyzed by mass spectrometry, and the data obtained showed the presence of products having empirical formulas consistent with those of (G) and (H).

The embodiments of the invention in which an exclusive property or privilege is claimed are defined as follows:

1. A compound having the formula

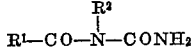

wherein $R^1$ and $R^2$, alike or different, are alkyl of up to 18 carbon atoms.

2. A compound of Claim 1, N-methyl-N-(1-pentanoyl)-urea.

3. A compound of Claim 1, N-acetyl-N-butylurea.
4. A compound of Claim 1, N-methyl-N-(trimethylacetyl)urea.
5. A compound of Claim 1, N-acetyl-N-(t-butyl)urea.
6. A compound of Claim 1, N-acetyl-N-methylurea.
7. A compound of Claim 1, N-methyl-N-tridecanoylurea.
8. A compound of Claim 1, N-acetyl-N-tridecylurea.
9. A process for making a compound having the formula

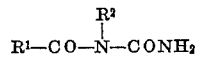

wherein $R^1$ and $R^2$ are the same or different alkyl, cycloalkyl, aryl, alkaryl or aralkyl groups of up to 18 carbon atoms, unsubstituted or substituted with a halogen, an alkoxy of up to 6 carbons, an aryloxy of 6–10 carbons, an alkoxycarbonyl of up to 7 carbons or an aryloxycarbonyl of 7 to 11 carbons, comprising reacting an N-cyanocarbimine of the formula

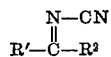

with a peroxide oxidant selected from the group consisting of hydrogen peroxide, trifluoroacetyl peroxide, tertiary butyl peroxide and m-chloroperbenzoic acid and a base selected from the group consisting of sodium carbonate, sodium hydroxide and potassium hydroxide at a temperature between —25° and 75° C. in the presence of an inert solvent selected from the group consisting of water and a mixture of water and a water-miscible solvent.

References Cited

UNITED STATES PATENTS

| 3,510,474 | 5/1970 | March | 260—347.7 X |
| 3,342,586 | 9/1967 | Lehureau et al. | 260—553 E |

FOREIGN PATENTS 875,722   8/1961   Great Britain.

OTHER REFERENCES

Aspelund: Chemical Abstracts, Vol. 68, pp. 5746–5747 (article 59467q) (1968).

Prager et al.: Beilsteins Handbuch de Organischen Chemie, Band IX, p. 221 (1926).

Lamchem: J. Chem. Soc., 1950., p. 748.

BERNARD HELFIN, Primary Examiner

M. W. GLYNN, Assistant Examiner

U.S. Cl. X.R.

260—239 A, 239.3 R, 239.3 T, 293.86, 326.5 FL, 472, 482 R, 553 A, 553 E; 424—244, 256, 274, 309, 311, 322